United States Patent
Henderson et al.

(10) Patent No.: US 10,637,722 B2
(45) Date of Patent: Apr. 28, 2020

(54) AUTOMATED REMOTE MESSAGE MANAGEMENT

(71) Applicant: INTERNATIONAL BUSINESS MACHINES CORPORATION, Armonk, NY (US)

(72) Inventors: Michael A. Henderson, Midlothian, TX (US); Randy S. Johnson, O'Fallon, MO (US); Richard I. Levey, Palatine, IL (US); Tedrick N. Northway, Wood River, IL (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 14/683,554

(22) Filed: Apr. 10, 2015

(65) Prior Publication Data

US 2016/0301734 A1 Oct. 13, 2016

(51) Int. Cl.
*G06F 11/07* (2006.01)
*H04L 12/24* (2006.01)
*H04L 12/58* (2006.01)

(52) U.S. Cl.
CPC ............ *H04L 41/069* (2013.01); *H04L 51/18* (2013.01); *H04L 51/34* (2013.01)

(58) Field of Classification Search
CPC .. G06F 9/4446; H04L 41/069; H04L 41/0631
USPC ........................................................ 709/223
See application file for complete search history.

(56) References Cited

U.S. PATENT DOCUMENTS

| | | | |
|---|---|---|---|
| 5,107,500 A | 4/1992 | Wakamoto et al. | |
| 5,794,239 A | 8/1998 | Walster et al. | |
| 6,766,368 B1 | 7/2004 | Jakobson et al. | |
| 7,509,415 B2 | 3/2009 | Baekelmans et al. | |
| 8,112,747 B2 | 2/2012 | Haeberle et al. | |
| 8,600,992 B2 | 12/2013 | Choi et al. | |
| 8,738,966 B2 | 5/2014 | Hopper | |
| 8,832,654 B2 | 9/2014 | Malnati | |
| 2004/0181677 A1* | 9/2004 | Hong | G06F 21/563 713/188 |
| 2005/0286435 A1* | 12/2005 | Ogawa | H04L 41/0654 370/252 |
| 2007/0088827 A1 | 4/2007 | Starbuck et al. | |

(Continued)

OTHER PUBLICATIONS

"Sanitization (classified information)". Wikipedia. <https://en.wikipedia.org/wiki/Sanitization_(classified_information)> (Year: 2015).*

(Continued)

*Primary Examiner* — Backhean Tiv
*Assistant Examiner* — Jonathan A Sparks
(74) *Attorney, Agent, or Firm* — Schmeiser, Olsen & Watts; Mark C. Vallone (57) ABSTRACT

A method and system for remotely managing messages is provided. The method includes receiving a status message associated with an operational status of hardware or software and determining, via execution of a message database table associated with a message database, that the status message includes a new message not located within the message database. The status message is added to the message database table and a search process for messages matching the status message is executed to determine if a match between the messages and status is located.

20 Claims, 7 Drawing Sheets

(56) References Cited

U.S. PATENT DOCUMENTS

| | | |
|---|---|---|
| 2007/0164849 A1 | 7/2007 | Haeberle et al. |
| 2010/0057677 A1* | 3/2010 | Rapp .................... G06F 9/4446 |
| | | 707/E17.014 |
| 2012/0198279 A1* | 8/2012 | Schroeder ........... G06F 11/2294 |
| | | 714/32 |
| 2014/0195863 A1 | 7/2014 | Gokhale et al. |
| 2014/0289229 A1 | 9/2014 | Gangadharaiah et al. |
| 2016/0110810 A1* | 4/2016 | Ashok ................ G06F 16/9535 |
| | | 705/36 R |

OTHER PUBLICATIONS

"Data Sanitization". UCRiverside. Security @ UCR. <https://cnc.ucr.edu/security/datasan.html> (Year: 2015).*

Tran et al.; Fault resolution system for inter-cloud environment; Journal of Mobile Multimedia; vol. 10, Issue 1 & 2; May 2014; pp. 16-29.

Anonymous; Monitoring Messages Relating to Operating Conditions of Software in a Mainframe System; IP.com; IP.com No. 000229912; Aug. 6, 2013; 3 pages.

* cited by examiner

AUTOMATED REMOTE MESSAGE MANAGEMENT

FIELD

The present invention relates generally to a method for automatically and remotely managing messages and in particular to a method and associated system for automatically handling previously non occurring messages.

BACKGROUND

Computing system hardware and applications typically generate status messages requiring operational actions. When a status message occurs that does not fit any automation filters, it may displayed to an operator, who may or may not know how to handle it. Reacting to the status messages may be very important to the successful operation of the computing system.

Accordingly, there exists a need in the art to overcome at least some of the deficiencies and limitations described herein above.

SUMMARY

A first aspect of the invention provides a message handling method comprising: receiving, by a computer processor of a computing system, a status message associated with an operational status of hardware or software; determining, by the computer processor executing a message database table associated with a message database of the computing system, that the status message comprises a new message not located within the message database; adding, by the computer processor, the status message to the message database table; executing, by the computer processor, a search process for messages matching the status message; and additionally determining, by the computer processor based on results of the executing, if a match between the messages and the status is located.

A second aspect of the invention provides a computing system comprising a computer processor coupled to a computer-readable memory unit, the memory unit comprising instructions that when executed by the computer processor implements a message handling method comprising: receiving, by the computer processor, a status message associated with an operational status of hardware or software; determining, by the computer processor executing a message database table associated with a message database of the computing system, that the status message comprises a new message not located within the message database; adding, by the computer processor, the status message to the message database table; executing, by the computer processor, a search process for messages matching the status message; and additionally determining, by the computer processor based on results of the executing, if a match between the messages and the status is located.

A third aspect of the invention provides a computer program product, comprising a computer readable hardware storage device storing a computer readable program code, the computer readable program code comprising an algorithm that when executed by a computer processor of a computing system implements a message handling method, the method comprising: receiving, by the computer processor, a status message associated with an operational status of hardware or software; determining, by the computer processor executing a message database table associated with a message database of the computing system, that the status message comprises a new message not located within the message database; adding, by the computer processor, the status message to the message database table; executing, by the computer processor, a search process for messages matching the status message; and additionally determining, by the computer processor based on results of the executing, if a match between the messages and the status is located.

The present invention advantageously provides a simple method and associated system capable of generating status messages requiring operational actions.

BRIEF DESCRIPTION OF THE DRAWINGS

FIG. 2, including

DETAILED DESCRIPTION

Figure 1:
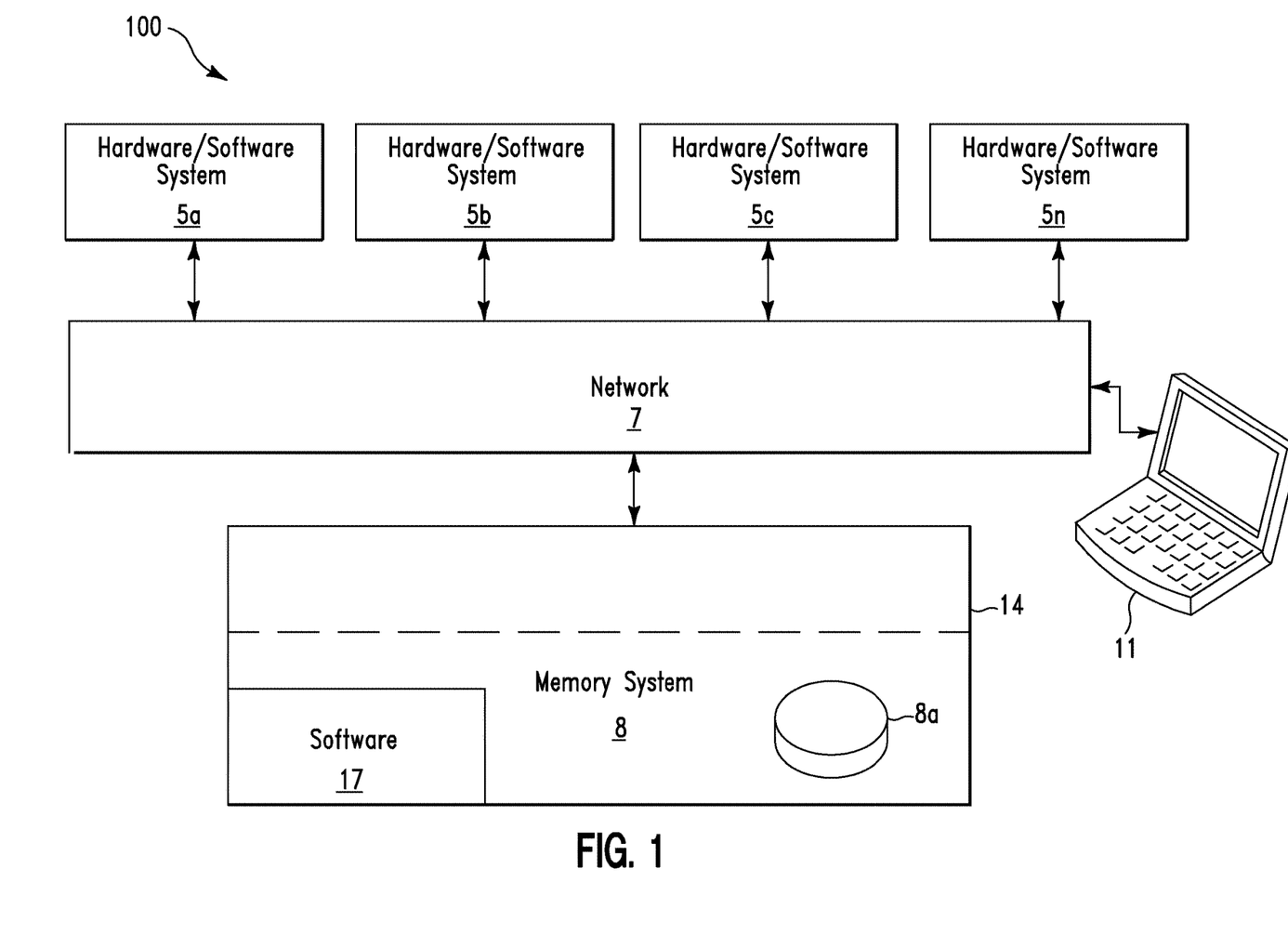
FIG. 1 illustrates a system for enabling a process for automatically and remotely managing messages, in accordance with embodiments of the present invention.
Figure 2A:
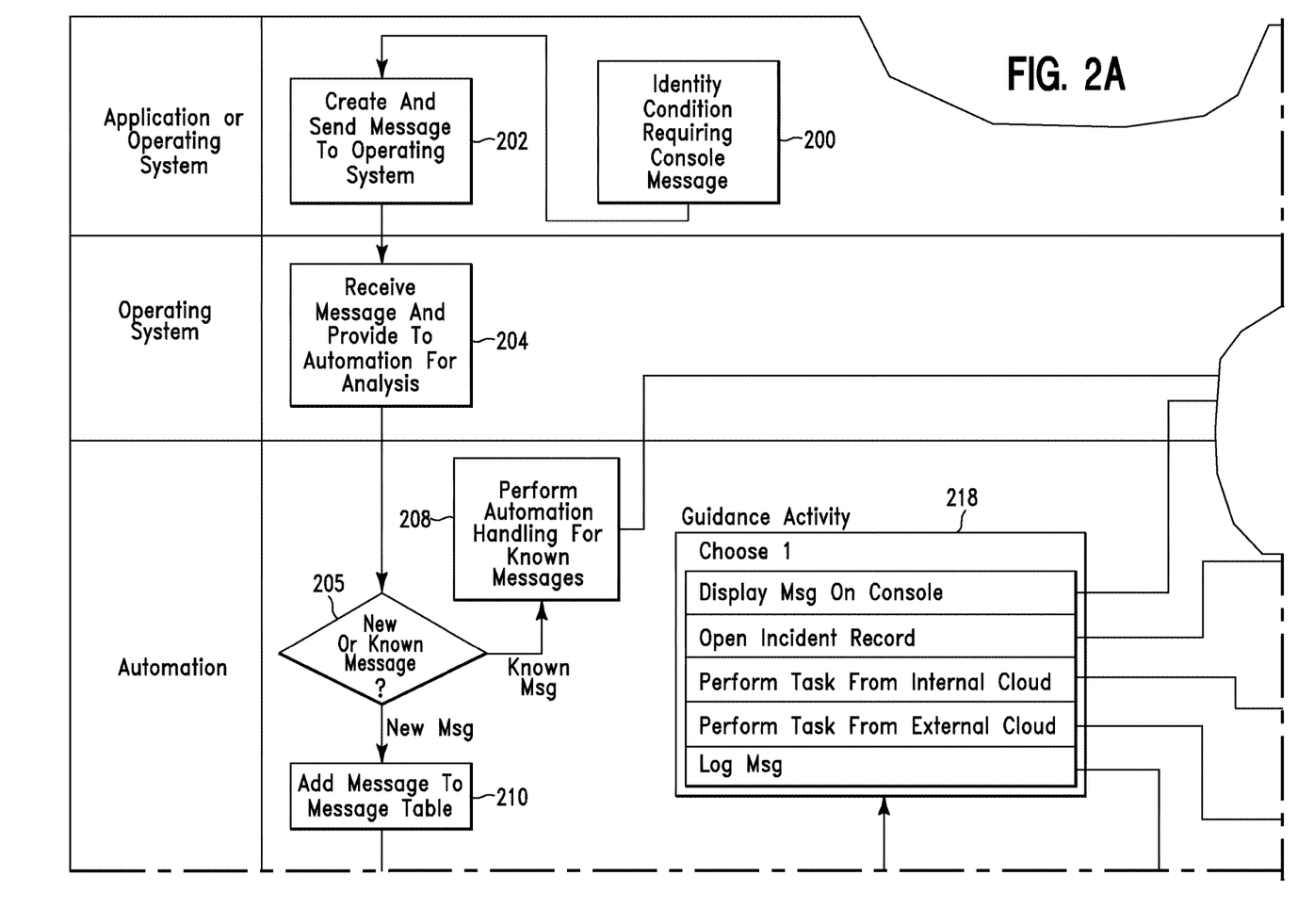
FIGS. 2A-2D, illustrates an algorithm detailing a process flow enabled by the system of FIG. 1 for automatically and remotely managing messages, in accordance with embodiments of the present invention.
Figure 2B:
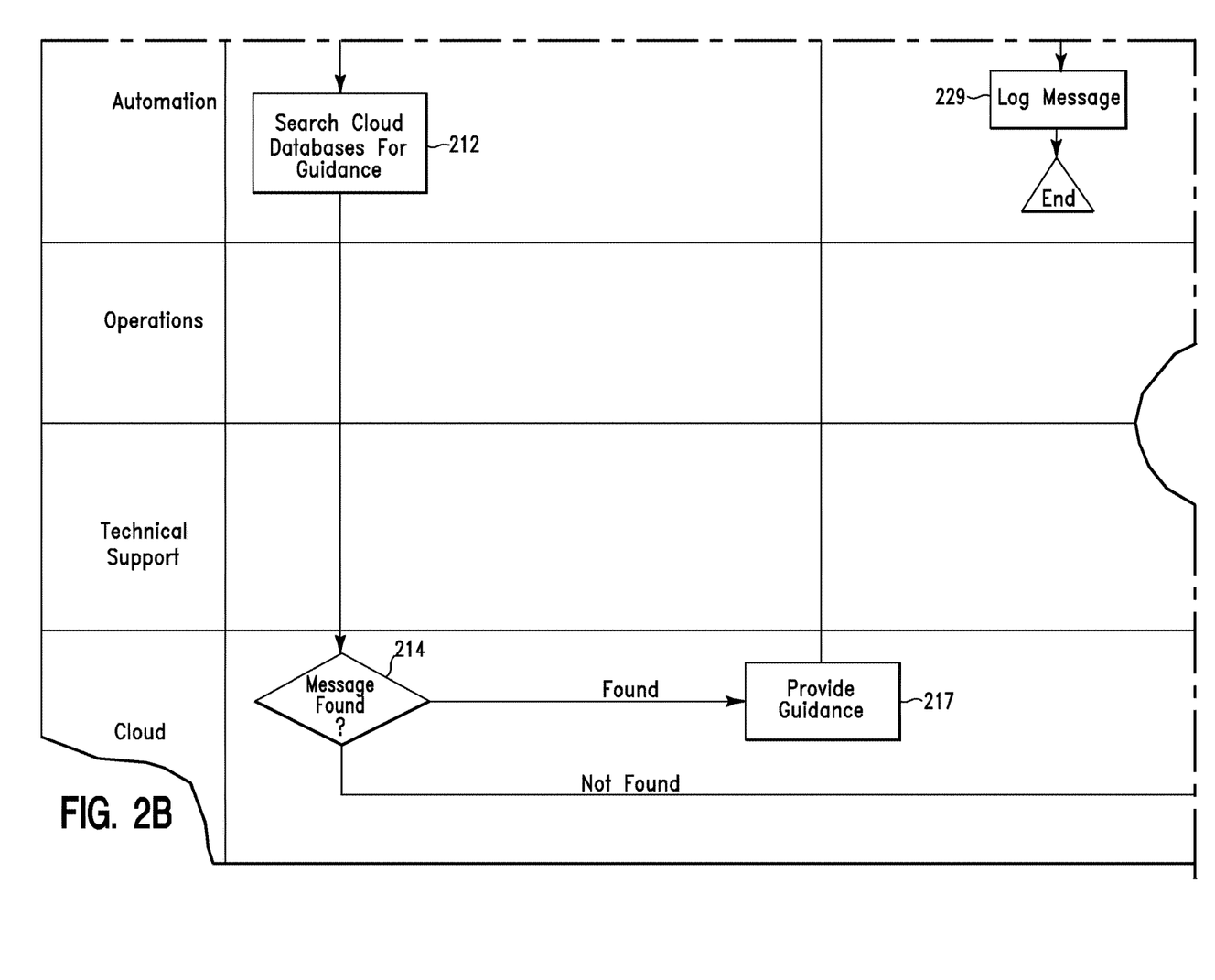
Figure 2C:
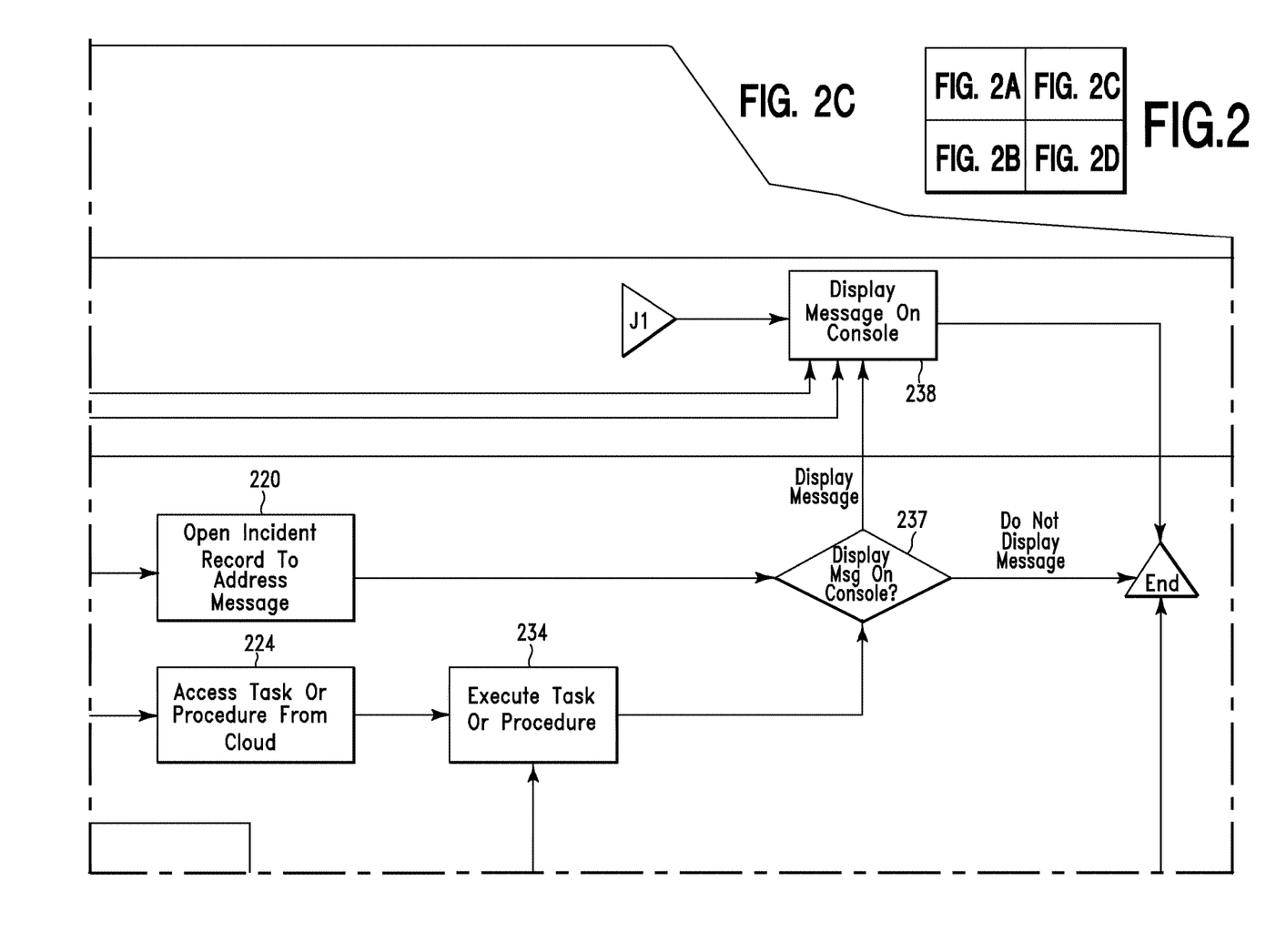
Figure 2D:
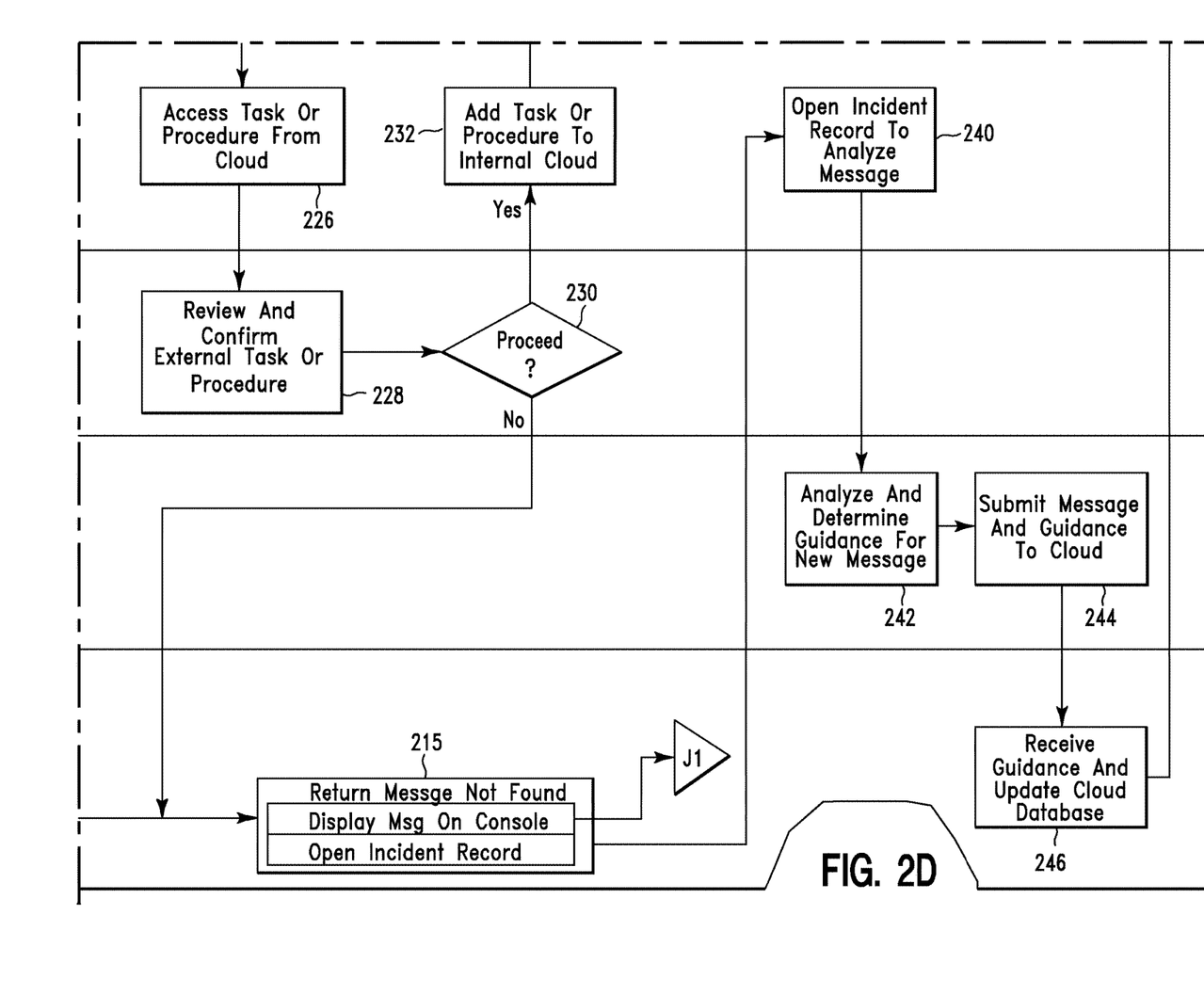

FIG. 1 illustrates a system 100 for enabling a process for automatically and remotely managing messages, in accordance with embodiments of the present invention. Standard messages are typically written to logs and displayed on consoles. Therefore, an operator must be available for viewing the messages so that they may be processed. System 100 enables a process for handling unknown messages via usage of organizational database information, public database information, developer information, etc. System 100 reduces system failures by ensuring that new messages associated with a warning for a new event are automatically addressed. System 100 automates an identification and handling process with respect to new computing system messages to ensure that appropriate actions are carried out for each message. Appropriate actions may include, inter alia, log actions, display on console actions, run a command actions, open an incident record actions, etc.

The method enabled by system 100 ensures that new messages are not lost within computing systems and are automatically addressed. System 100 automatically identifies messages not handled by current automation and references one or more cloud databases (e.g., public best practices, organizational best practices, application/hardware developer, etc.) to obtain recommended actions for the associated message. Additionally, application or hardware developers may could provide a list of messages for their component and provide suggested actions for each message. Each new message is categorized and receives guidance from the cloud database for management of the message. Message guidance received from outside an organization may be validated with operations staff prior to execution based on security protocols.

System 100 of FIG. 1 includes hardware/software systems 5a . . . 5n and a graphical user interface (GUI) console 11 connected through a network 7 to a computing system 14. Network 7 may include any type of network including, inter alia, a local area network, (LAN), a wide area network (WAN), the Internet, a wireless network, etc. Hardware/software systems 5a . . . 5n may include any type of hardware device and/or software systems including, inter alia, a computer (PC), a laptop computer, a tablet computer, a server, a PDA, a smart phone, a secure Website, an application, etc. GUI console 11 may comprise any type of GUI based system. Computing system 14 may include any type of computing system(s) including, inter alia, a computer (PC), a laptop computer, a tablet computer, a server, a database system, etc. Computing system 14 includes a memory system 8. Memory system 8 may include a single memory system. Alternatively, memory system 8 may include a plurality of memory systems. Memory system 8 includes a database 8a and software 17. Database 8a may include a database table. Software 17 enables system 100 to perform a process that includes:

1. Providing a database (e.g., database 8a) of messages and corresponding actions to enable for an account.
2. Receiving a new message not found in the database.
3. Searching message boards, knowledge databases, and social media for matches to the new message.
4. Usage of natural language processing (NLP) with respect to the matches to select an action based on a criteria for associated actions.
5. Presentation of the selected action to a console operator such that the operator may apply the selected action if deemed appropriate. If the applied action is successful, the action and corresponding message may be added to the database of messages and corresponding actions for future use.

FIG. 2, including FIGS. 2A-2D, illustrates an algorithm detailing a process flow enabled by system 100 of FIG. 1 for enabling a process for automatically and remotely managing messages, in accordance with embodiments of the present invention. Each of the steps in the algorithm of FIG. 2 may be enabled and executed in any order by a computer processor executing computer code. In step 200, a condition requiring console message is identified. For example, an application or operating system component may identify a condition requiring a console message. In step 202, a message is generated and transmitted to an operating system. The message may be formatted as per operating system requirements and transmitted to an operating system message handler for processing. In step 204, the message is received and automation is provided for analysis. The message handler receives the message and provides the message to the automation subsystem for processing. In step 205, it is determined (via usage of a message table and an automation tool) if the message comprises a new or known console message.

If in step 205, it is determined that the message comprises a known console message then in step 208, an automation process for handling known messages is executed. For example, a process for filtering may be executed with respect to handling the known message. In step 238, the known message is displayed on a console.

If in step 205, it is determined that the message comprises a new console message then in step 210, the message is added to a message (database) table and an analysis of the message handling process is initiated. In step 212, cloud databases a queried for guidance associated with the message handling process (i.e., identifying a method for handling the new message). For example, internal automation databases, shared message automation databases, vendor sites, search forums, and other search media may be queried. The query may be executed in real time or offline. Additionally, a message index may be generated to enable a real time search. Furthermore (with respect to service providers), a message guidance database (i.e., comprising recommended actions for computing messages) may be aggregated to form an internal company automation database. Alternatively, individual account automation databases, redbooks, and/or internal company social media (e.g., forums) may be searched for recommended actions. If a new message is located then an optimal solution is enabled as the associated database is determined to be a trusted source associated with a service provider. Associated recommended actions may comprise very clear direction (e.g., filter the message, open an incident, etc.) or the associated recommended actions may require analytics to understand/develop the action (e.g., clear the log as translated to a procedure that includes the steps 'Access the Log file, Archive the current log file, delete the log file contents'). If no guidance is located within the internal cloud databases, trusted business partners/vendors cloud databases are accessed. For example, a company A may utilize a remedy service management tool to access vendor support materials, (including a message library), website, manuals, service library, FAQs, and social media (e.g., forums, questions, blogs etc.) to attempt to identify recommended actions. Additionally, analytics may be required to develop an executable procedure. Furthermore, crowd sourced automation databases, social media, the web, and additional unaffiliated sources may be searched for guidance. However, before utilization of any recommendations, a guidance/procedure may be reviewed to ensure no harmful effects may take place such as items such as malware or malicious changes to an innocent activity that may not be an issue in a university environment, may not be acceptable in a business environment. For example, a university may reboot a server at any time during the day to clean up a memory message while a business may choose to operate at a reduced capacity or failover to another server to avoid a production outage.

In step 214, it is determined if an associated message is located during the query of step 212.

If in step 214, it is determined that an associated message is not located during the query of step 212 then in step 215, it is determined that the associated message may comprise a locally defined message that must be manually investigated and displayed on the console in step 238. In step 240, an incident record is opened in an incident ticketing system for the technical support team to identify actions necessary for the new message. In step 242, guidance for the new message is determined based on the following procedure:

1. A cloud body comprising knowledge associated with a product or message is made available to assist a support team with respect to formulating a plan to address an issue raised by the message.
2. Information gathered from the cloud sources is compiled into a message resolution document that is placed in an internal database accessible to support personnel.
3. An incident record is received and analyzed so that actions to perform for the new message may be determined. Actions may include, inter alia, filtering, displaying on a console, performing one or more tasks, opening an incident record, etc.

In step 244, a message and associated guidance are submitted to a cloud as follows:

1. Support staff use the cloud information to help resolve why a message was issued and what procedure is required to remediate any problem that the message may have highlighted.
2. The new message and developed automation guidance are submitted to the internal cloud. Additionally, customer information is sanitized before submitting to an external cloud database. In step 246, guidance is received and the cloud database is updated accordingly.

If in step 214, it is determined that an associated message is located during the query of step 212 then in step 217, guidance is provided such that if associated methods are located in multiple cloud databases, guidance from internal databases is prioritized with respect to vendor sites, shared databases, and social media. Additionally, extra weighting may be provided to a method repeated in multiple sites. The prioritized method is returned. In step 218, an option is selected as follows:

1. For a message display only, step 238 is executed for display of the message on the console.
2. To open an incident record, step 220 is executed as described, infra.
3. To perform a procedure from a trusted source, step 224 is executed as described, infra.
4. To perform a procedure from an external source, step 226 is executed as described, infra.
5. For message logging only, step 229 is executed to log the message.

In step 220, an incident record is automatically opened to handle the message. Additionally, the incident record may be automatically assigned to an appropriate team as per message formatting or content. Alternatively, the incident record may be assigned to the incident manager to review and assign. In step 237, the message is determined to be displayed on the console.

In step 224, a task or procedure is accessed from an (Internal) cloud such that guidance may be identified from a trusted source. For example, a shared internal automation procedure database, etc. The identified procedure/method/tasks are stored in an automation library. In step 234, the task or procedure is executed and step 237 is executed as described, supra.

In step 226, a task or procedure is accessed from an external cloud such that guidance may be identified from another source. For example, a vendor site, a forum, a crowd-sourced automation procedure database, etc. The external task or procedure is presented for review prior to execution. In step 228, the external task or procedure is reviewed and confirmed. For example, the task or procedure may be reviewed to ensure it is not malicious and may be subsequently configured for the local environment. In step 230, it is determined if the external task or procedure should be used to address the message. If in step 230, it is determined that the external task or procedure should not be used to address the message then step 215 is executed as described, supra. If in step 230, it is determined that the external task or procedure should be used to address the message then step in 232, the external task or procedure added to the internal cloud and step 234 is executed as described, supra.

The following examples describe implementation scenarios associated with execution of the algorithm of FIG. 2.

Example 1

The process described with respect to example 1 comprises a trusted internal message scenario. The process is initiated when an application B generates a message app9994a. In response, an automation component receives the message app9994a and queries a message table for a match. A match is unable to be located and therefore it is determined that, this is the first time that message app9994a has been seen on this system. In response, an internal company cloud database is searched for the message app9994a. A match is located (in the internal company database) and associated guidance indicates that an associated failure comprises a full system log and provides a procedure with respect to emptying a system log. The guidance is retrieved from an internal, reputable cloud and therefore does not need customization. In response, the actions are performed and normal operations are resumed.

Example 2

The process described with respect to example 2 comprises a trusted external message scenario. The process is initiated when an application B produces a message app9994a. In response, an automation component receives the message app9994a and queries a message table for a match. A match is unable to be located and therefore it is determined that this is the first time that message app9994a has been seen on this system. In response, an internal company cloud database is searched for the message app9994a. A match is not located and therefore external cloud databases are searched. A match is located in a crowd-sourced automation database and associated guidance indicates that an associated failure comprises a full system log and provides a procedure with respect to emptying a system log. The guidance is retrieved from an external source, so to avoid any malicious code, the procedures is reviewed by the operations or technical team before being performed. The procedure checks out, the actions are performed, and normal operations are resumed.

Figure 3:
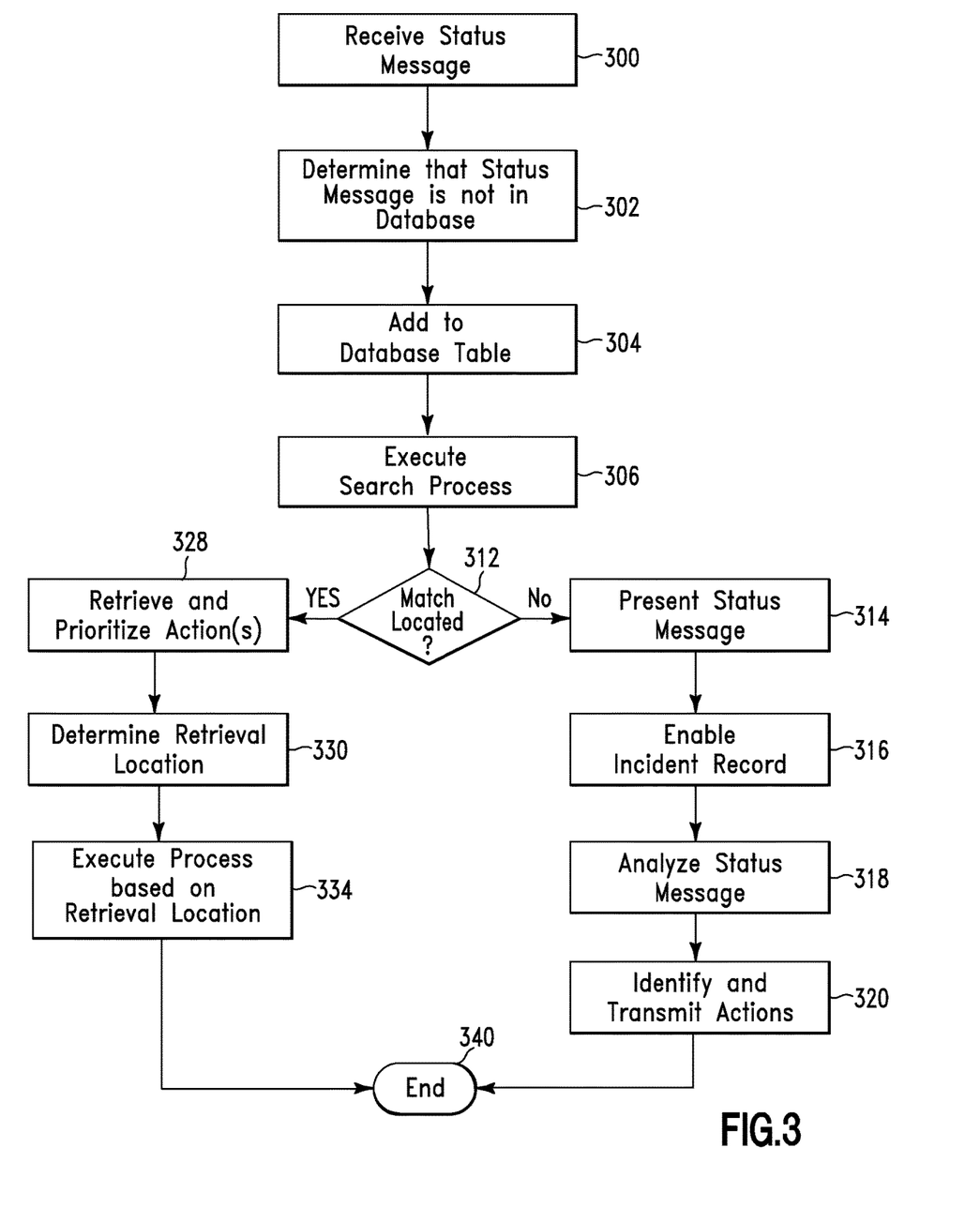
FIG. 3 illustrates an algorithm detailing a process flow enabled by the system of FIG. 1 for enabling a process for automatically and remotely determining messages, in accordance with embodiments of the present invention.

FIG. 3 illustrates an algorithm detailing a process flow enabled by system 100 of FIG. 1 for enabling a process for automatically and remotely determining messages, in accordance with embodiments of the present invention. Each of the steps in the algorithm of FIG. 3 may be enabled and executed in any order by a computer processor executing computer code. In step 300, a status message associated with an operational status of hardware or software is received by a computing system. In step 302, it is determined (via execution of a message database table associated with a message database) that the status message comprises a new message not located within the message database. In step 304, the status message is added to the message database table. In step 306, a search process for messages matching the status message is executed. In step 312, it is determined (based on results of step 306) if a match between the messages and the status is located.

If in step 312, it is determined that a match between the messages and the status has not been located then in step 314, the status message is presented via an incident GUI console. In step 316, an incident record within an incident ticketing system for analyzing the status message is enabled. In step 318, the status message is analyzed based on feedback from a technical support team. The analysis may include:

1. Determining (based on data associated with the status message) a plan for addressing issues associated with the status message.
2. Compiling the data into a message resolution document.
3. Selecting (based on analysis of the message resolution document) at least one action of the associated message handling actions.

In step 320, associated message handling actions required for the status message are identified and transmitted to a remote storage system and the process is terminated in step 340.

If in step 312, it is determined that a match between the messages and the status has been located then in step 328, at least one message handling action associated with the status message is retrieved and prioritized. In step 330, it is determined that the at least one message handling action has been retrieved from an internal trusted database or and external database. In step 334, a process is executed based on determining if the at least one message handling action has been retrieved from an internal trusted database or and external database. If the at least one message handling action has been retrieved from an internal trusted database the process comprises accessing and executing the at least one message handling action with respect to the status message. If the at least one message handling action has been retrieved from an external database then the process comprises:

1. Accessing and reviewing the at least one message handling action.
2. Determining (based on results of the review) that the at least one message handling action does not comprise a malicious action(s).
3. Storing (within an internal database) the at least one message handling action.
4. Executing the at least one message handling action with respect to the status message.
5. Presenting the status message via an incident GUI console.

The process is terminated in step 340.

Figure 4:
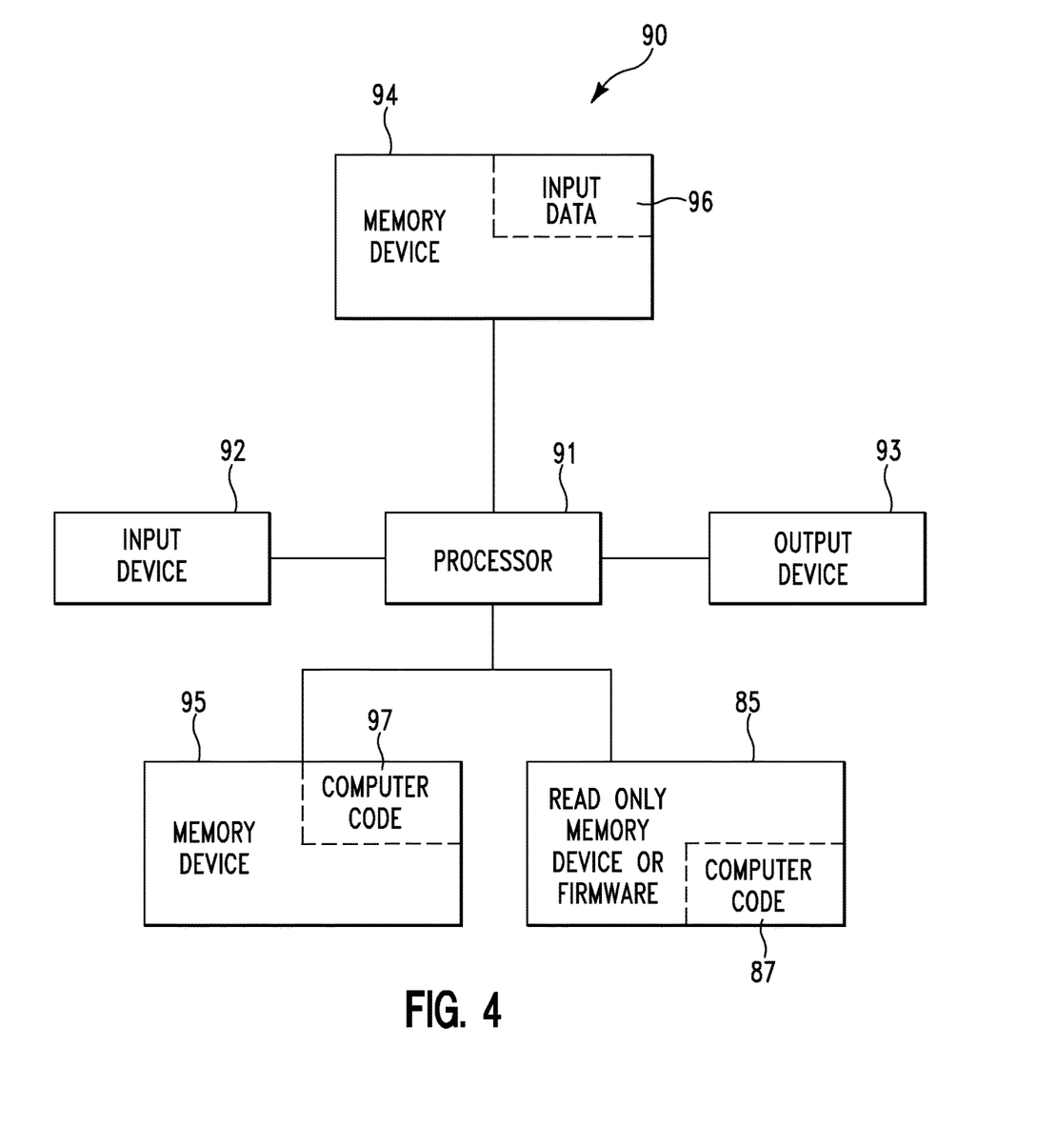
FIG. 4 illustrates a computer system for enabling a process for automatically and remotely managing messages, in accordance with embodiments of the present invention.

FIG. 4 illustrates a computer system 90 (e.g., computing system 14 of FIG. 1) for enabling a process for automatically and remotely managing messages, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a process for automatically and remotely managing messages. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2 and 3) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for automatically and remotely managing messages. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for automatically and remotely managing messages. In another embodiment, the invention provides a business method that performs the process steps of the invention on a subscription, advertising, and/or fee basis. That is, a service supplier, such as a Solution Integrator, could offer to allow users to enable a process for automatically and remotely managing messages. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A message handling system failure reduction method comprising:

receiving, by a computer processor of a computing system, a status message associated with an operational status of hardware or software;

formatting, by said computer processor and a message handler circuit comprising programmable logic circuitry utilizing state information of computer readable program instructions to personalize electronic circuitry of said message handler circuit, said status message with respect to operating system requirements with respect to displaying said status message by an operating system executed by said computing system;

determining, by said computer processor executing a message database table associated with a message database of said computing system, that said status message comprises a new and unknown message not located within said message database;

adding, by said computer processor, said status message to said message database table;
first executing, by said computer processor, a real time search process for messages matching said status message;
additionally determining, by said computer processor based on results of said first executing, if a match between said messages and said status message is located;
executing, by said computer processor, natural language processing (NLP) code with respect to said match;
additionally executing, by said computer processor, a real time database query with respect to internal automation databases, shared message databases, and search forums, resulting in locating said match;
selecting, by said computer processor based on results of said executing and said additionally executing, actions associated with said status message, wherein said actions comprise computer memory log actions, computer console display actions, and computer command actions;
analyzing, by said computer processor, said actions resulting in associated memory log files being deleted;
generating, by said computer processor, executable actions related to said actions;
detecting, by said processor based on results of said analyzing, that said executable actions do not include malware, malicious code, and malicious changes associated with said executable actions;
second executing, by said computer processor in response to said detecting, said executable actions with respect to a server computer;
rebooting, with respect to results of said second executing and said detecting, said server computer;
cleaning, in response to said rebooting, a memory message; and
selecting, an operation comprising a reduced capacity or failover with respect to said server computer for avoiding a production outage.

2. The method of claim 1, wherein results of said determining indicate that said match has not been located, and wherein said method further comprises:
presenting, by said computer processor, said status message via an incident GUI console;
generating, by said computer processor, an incident record within an incident ticketing system for analyzing said status message;
analyzing in response to said enabling, by said computer processor based on feedback from a technical support team, said status message;
identifying, by said computer processor based on results of said analyzing, associated message handling actions required for said status message; and
transmitting, by said computer processor to a remote storage system, said associated message handling actions and said status message.

3. The method of claim 2, wherein said analyzing comprises:
determining, by said computer processor based on data associated with said status message, a plan for addressing issues associated with said status message;
compiling, by said computer processor, said data into a message resolution document; and
selecting, by said computer processor based on analysis of said message resolution document, at least one action of said associated message handling actions.

4. The method of claim 1, wherein results of said determining indicate that said match has been located, and wherein said method further comprises:
retrieving, by said computer processor, at least one message handling action associated with said status message; and
prioritizing, by said computer processor based on locations said at least one message handling action is retrieved from, said multiple message handling actions.

5. The method of claim 4, further comprising:
determining, by said computer processor, that said at least one message handling action has been retrieved from an internal, to said computing system, trusted database;
accessing, by said computer processor, said at least one message handling action; and
executing, by said computer processor, said at least one message handling action with respect to said status message.

6. The method of claim 4, further comprising:
determining, by said computer processor, that at least one message handling action has been retrieved from an external, to said computing system, database;
accessing, by said computer processor, said at least one message handling action;
reviewing, by said computer processor, said at least one message handling action;
determining, by said computer processor based on results of said reviewing, that said at least one message handling action does not comprise malicious actions;
storing, by said computer processor within a database internal to said computing system, said at least one message handling action;
executing, by said computer processor, said at least one message handling action with respect to said status message; and
presenting, by said computer processor, said status message via an incident GUI console.

7. The method of claim 1, wherein said executing said search process comprises a real time process comprising:
querying an internal company automation database, at least one of a trusted business partner database, or a crowd sourced automation database for locating messages matching said status message.

8. The method of claim 1, wherein said executing said search process comprises an offline process comprising:
generating, by said computer processor, an index database comprising an index associated with at least one of an internal company automation database, a trusted business partner database, or a crowd sourced automation database; and
querying said index database for locating messages matching said status message.

9. The method of claim 1, further comprising:
providing at least one support service for at least one of creating, integrating, hosting, maintaining, and deploying computer-readable code in the computing system, said code being executed by the computer processor to implement: said receiving, said determining, said adding, said executing, and said additionally determining.

10. A computing system comprising a computer processor coupled to a computer-readable memory unit, said memory unit comprising instructions that when executed by the computer processor implements a message handling system failure reduction method comprising:
receiving, by said computer processor, a status message associated with an operational status of hardware or software;

formatting, by said computer processor and a message handler circuit comprising programmable logic circuitry utilizing state information of computer readable program instructions to personalize electronic circuitry of said message handler circuit, said status message with respect to operating system requirements with respect to displaying said status message by an operating system executed by said computing system;

determining, by said computer processor executing a message database table associated with a message database of said computing system, that said status message comprises a new and unknown message not located within said message database;

adding, by said computer processor, said status message to said message database table;

first executing, by said computer processor, a real time search process for messages matching said status message;

additionally determining, by said computer processor based on results of said first executing, if a match between said messages and said status message is located;

executing, by said computer processor, natural language processing (NLP) code with respect to said match;

additionally executing, by said computer processor, a real time database query with respect to internal automation databases, shared message databases, and search forums, resulting in locating said match;

selecting, by said computer processor based on results of said executing and said additionally executing, actions associated with said status message, wherein said actions comprise computer memory log actions, computer console display actions, and computer command actions;

analyzing, by said computer processor, said actions resulting in associated memory log files being deleted;

generating, by said computer processor, executable actions related to said actions;

detecting, by said processor based on results of said analyzing, that said executable actions do not include malware, malicious code, and malicious changes associated with said executable actions;

second executing, by said computer processor in response to said detecting, said executable actions with respect to a server computer;

rebooting, with respect to results of said second executing and said detecting, said server computer;

cleaning, in response to said rebooting, a memory message; and selecting, an operation comprising a reduced capacity or failover with respect to said server computer for avoiding a production outage.

11. The computing system of claim 10, wherein results of said determining indicate that said match has not been located, and wherein said method further comprises:

presenting, by said computer processor, said status message via an incident GUI console;

generating, by said computer processor, an incident record within an incident ticketing system for analyzing said status message;

analyzing in response to said enabling, by said computer processor based on feedback from a technical support team, said status message;

identifying, by said computer processor based on results of said analyzing, associated message handling actions required for said status message; and transmitting, by said computer processor to a remote storage system, said associated message handling actions and said status message.

12. The computing system of claim 11, wherein said analyzing comprises:

determining, by said computer processor based on data associated with said status message, a plan for addressing issues associated with said status message;

compiling, by said computer processor, said data into a message resolution document; and selecting, by said computer processor based on analysis of said message resolution document, at least one action of said associated message handling actions.

13. The computing system of claim 10, wherein results of said determining indicate that said match has been located, and wherein said method further comprises:

retrieving, by said computer processor, at least one message handling action associated with said status message; and prioritizing, by said computer processor based on locations said at least one message handling action is retrieved from, said multiple message handling actions.

14. The computing system of claim 13, wherein said method further comprises:

determining, by said computer processor, that said at least one message handling action has been retrieved from an internal, to said computing system, trusted database;

accessing, by said computer processor, said at least one message handling action; and executing, by said computer processor, said at least one message handling action with respect to said status message.

15. The computing system of claim 13, wherein said method further comprises:

determining, by said computer processor, that at least one message handling action has been retrieved from an external, to said computing system, database;

accessing, by said computer processor, said at least one message handling action;

reviewing, by said computer processor, said at least one message handling action;

determining, by said computer processor based on results of said reviewing, that said at least one message handling action does not comprise malicious actions;

storing, by said computer processor within a database internal to said computing system, said at least one message handling action;

executing, by said computer processor, said at least one message handling action with respect to said status message; and presenting, by said computer processor, said status message via an incident GUI console.

16. The computing system of claim 10, wherein said executing said search process comprises a real time process comprising:

querying an internal company automation database, at least one of a trusted business partner database, or a crowd sourced automation database for locating messages matching said status message.

17. The computing system of claim 10, wherein said executing said search process comprises an offline process comprising:

generating, by said computer processor, an index database comprising an index associated with at least one of an internal company automation database, a trusted business partner database, or a crowd sourced automation database; and querying said index database for locating messages matching said status message.

18. A computer program product, comprising a computer readable hardware storage device storing a computer readable program code, said computer readable program code comprising an algorithm that when executed by a computer processor of a computing system implements a message handling system failure reduction method, said method comprising:
- receiving, by said computer processor, a status message associated with an operational status of hardware or software;
- formatting, by said computer processor and a message handler circuit comprising programmable logic circuitry utilizing state information of computer readable program instructions to personalize electronic circuitry of said message handler circuit, said status message with respect to operating system requirements with respect to displaying said status message by an operating system executed by said computing system;
- determining, by said computer processor executing a message database table associated with a message database of said computing system, that said status message comprises a new and unknown message not located within said message database;
- adding, by said computer processor, said status message to said message database table;
- first executing, by said computer processor, a real time search process for messages matching said status message;
- additionally determining, by said computer processor based on results of said first executing, if a match between said messages and said status message is located;
- executing, by said computer processor, natural language processing (NLP) code with respect to said match;
- additionally executing, by said computer processor, a real time database query with respect to internal automation databases, shared message databases, and search forums, resulting in locating said match;
- selecting, by said computer processor based on results of said executing and said additionally executing, actions associated with said status message, wherein said actions comprise computer memory log actions, computer console display actions, and computer command actions;
- analyzing, by said computer processor, said actions resulting in associated memory log files being deleted;
- generating, by said computer processor, executable actions related to said actions;
- detecting, by said processor based on results of said analyzing, that said executable actions do not include malware, malicious code, and malicious changes associated with said executable actions;
- second executing, by said computer processor in response to said detecting, said executable actions with respect to a server computer;
- rebooting, with respect to results of said second executing and said detecting, said server computer;
- cleaning, in response to said rebooting, a memory message; and
- selecting, an operation comprising a reduced capacity or failover with respect to said server computer for avoiding a production outage.

19. The computer program product of claim 18, wherein results of said determining indicate that said match has not been located, and wherein said method further comprises:
- presenting, by said computer processor, said status message via an incident GUI console;
- generating, by said computer processor, an incident record within an incident ticketing system for analyzing said status message;
- analyzing in response to said enabling, by said computer processor based on feedback from a technical support team, said status message;
- identifying, by said computer processor based on results of said analyzing, associated message handling actions required for said status message; and
- transmitting, by said computer processor to a remote storage system, said associated message handling actions and said status message.

20. The computer program product of claim 19, wherein said analyzing comprises:
- determining, by said computer processor based on data associated with said status message, a plan for addressing issues associated with said status message;
- compiling, by said computer processor, said data into a message resolution document; and
- selecting, by said computer processor based on analysis of said message resolution document, at least one action of said associated message handling actions.

* * * * *